INVENTORS.
WILLIAM P. CHAPMAN
CARLETON C. SMITH
JOHN C. DONOVAN
Andrus & Starke
ATTORNEYS

INVENTORS.
WILLIAM P. CHAPMAN
CARLETON C. SMITH
JOHN C. DONOVAN

Andrus & Starke
ATTORNEYS

INVENTORS.
WILLIAM P. CHAPMAN
CARLETON C. SMITH
JOHN C. DONOVAN
Andrus & Starke
ATTORNEYS 3,396,379
BINARY CODED CONTROL
William P. Chapman, Milwaukee, Carleton C. Smith, Menomonee Falls, and John C. Donovan, Milwaukee, Wis., assignors to Johnson Service Company, Milwaukee,, Wis., a corporation of Wisconsin
Filed Sept. 12, 1962, Ser. No. 223,233
21 Claims. (Cl. 340—347)

This invention relates to a binary coded control and particularly to a control for direct selection of one of a substantial number of remotely located controlled points.

Remote controls in many applications must be adapted to select a particular one of a plurality of scattered remote pickup points for purposes of controlling or monitoring of a process, apparatus or the like at the particular pickup points. A highly satisfactory control system employing a binary code is disclosed and claimed in the copending application of William P. Chapman and Carleton C. Smith entitled Binary Logic Coded Control, Ser. No. 218,386 which was filed on Aug. 21, 1962 and is assigned to a common assignee herewith. This copending application discloses a method and apparatus for selecting and transmitting data from particular and scattered remote pickup points to a control center through a relatively small number of transmission wires. In accordance with that invention, a decoding system employs a binary counting system with each remote location being assigned a binary number. Selection is made by encoding a selection line cable, having a separate selection line for each significant binary bit. The illustrated embodiment shown in that application employs a three bit binary code with the complete selection system broken down into primary groups including seven secondary subgroups each of which may include seven selection or pickup points to be controlled. The primary and secondary groups are restricted to seven units corresponding to the possible permutations of a three bit binary code with the exclusion of the binary number 000 which is the standby circuit condition. Separate selection cables are provided for the primary groups and the secondary groups. In the subgroup concept, secondary group capacity must be sufficiently large that all elements in the largest secondary group can be uniquely selected. If all of the secondary subgroups of the system are not of equal size a portion of logic capacity is not employed in the smaller groups. Further, if the largest group contemplated, considering present demand and future expansion, will not utilize the full capacity of a given N wire selection system, inefficiency is introduced into the complete system. Generally, the inefficiencies manifest themselves in the form of an excess number of selection wires over and above the very minimum adapted to the binary coded system. Where a relatively small number of selection points is involved, the inefficiencies may not be of substantial significance. However, as substantial numbers of remote location points are involved in the system, capacity may be such that the group and subgroup concept is not practically applied to its greatest advantage.

Further, in a direct binary number coded system the construction of a great variety of different decoding circuits are required. As the number of binary bits increase with an increasing maximum binary number required for greater capacity, the manufacture, inventory, and related problems become extremely severe. The previously referred to application of Chapman and Smith does propose providing a basic card module supplied with decoding and disconnect transistors of general construction with the necessary interconnections made in the field in accordance with the various binary codes. In that system, the basic card is field wired to discriminate between the various codes by having certain of the transistors grounded and the others grounded through the selection lines. The wiring of the cards in the field demand highly skilled technicians and a substantial wiring time such that installation and maintenance costs become relatively large for an installation of any magnitude. Certain of the cards also include completely unneeded and inoperative components. To inventory a great number of different possible code cards would of course be possible but would result in extremely high manufacturing and inventory costs in contrast to the use of the basic module.

The group and subgroup concept need not be employed. However, extensive binary number combinations would be required to provide, for example, direct connection of one single large group. The accompanying manufacturing, installation and maintenance costs would, of course, increase substantially.

Although the binary coded control system therefore has many advantages from a standpoint of economy, reliability and life, as well as simplicity of construction and operation, certain disadvantages are inherent in the direct application of the binary code system for some installations and particularly those of substantial capacity.

The present invention is directed to a binary coding system employing the teaching of the aforementioned application and applying it in a new and novel manner. The present invention particularly provides improvements which make practical an alternative to the primary-secondary subgroup method and in which the controlled points are directly connected by a minimum number of selection lines to the control center. The features of this invention produce maximum efficiency in the use of the logic potential of the binary coded system and substantially reduce the number of basic code cards necessary for use therein. As a result manufacturing, inventory and maintenance costs are minimized. The present invention also increases the flexibility of a binary coded system while including simple and inexpensive means for expanding the logic capacity of a given installation without the revising of the field wiring and existing decoding stations or points.

In accordance with an aspect of the present invention, a binary coded system is applied with each selection point individually connected to the control center by a selection cable which extends to each decoding or pickup point.

A multiple position code system is employed with each position including one of a plurality of similar characters or numbers each of which is related to one of a plurality of unique binary numbers. The binary number is conventionally represented by a combination of the digits 0 and 1 and in accordance with the present invention binary numbers are preferably selected corresponding to the decimal digits 0–7, as hereinafter described. At each pickup point, a decoding circuit is provided which includes a plurality of binary decoders, one for each code position, connected in a logic output control circuit.

Each decoder is also connected in a logic output circuit, forming a part of the control circuit, in accordance with the predetermined encoded binary number.

The selection cable includes a separate group of selection lines for each of the decoders. The selection lines are suitably connected or adapted to be connected to a binary encoding unit at the control center for encoding the various binary numbers thereon. The logic output control circuit requires that the various decoders be properly actuated at any one selection point by suitable encoding at the control center to establish and condition the individual logic output circuits at the desired selection point.

In accordance with the present invention, the binary circuit control logic is expanded by counting to a predetermined base in which binary numbers are conveniently applied and most practically and efficiently employs the three bit binary code which provides eight significant combinations of the digits 0 and 1. The code would then count to the base eight with each number or code position of the identification code having its digit represented by a three bit binary decoder encoded to one of said eight significant digits at the selection point.

A substantial advantage of this invention resides in the grouping of the binary numbers in accordance with the permutations of the zeros and the ones of the binary representations and forming multiple functioning code cards in accordance with this grouping. For example, in the three bit binary code applied to a binary octal identification counting system all of the significant numbers and representations fall into four main groups; namely, three zeros, three permutations of two zeros and a one, three permutations of two ones and a zero, and three ones. In accordance with this invention, four different basic circuit cards may be manufactured with two of them performing multiple functions depending upon the permutations of zeros and ones that card must be able to represent in coded form. Each card is constructed with the minimum number of components required for the related binary representation and may be wired drectly to different sets of input terminals for the respective different binary representations. The present invention in its most efficient use includes a further reduction of the basic code components or cards to two modules by combining the representation of three zeros with the three permutations of two zeros and a one and similarly combining the three ones with the three permutations of two ones and a zero. Each card then accepts four of the eight possible binary representations.

The basic code cards are constructed with prewired separate plug-in inputs for each of the various logic inputs. The two basic decoder cards are preferably formed as a printed square card with the decoding elements mounted thereon and interconnected with groups of terminals on the four edges constituting inputs coded to the four possible binary representations for the related card. Such a construction may be readily mass produced and installed with a minimum requirement of skill and experience. The cost of inventory including parts and records is held to a practical minimum.

Each card would contain an additional logic input over and above that which would be in operation at any given time. However, the reduction in manufacturing costs and inventory including record costs compensate for any such slight additional component cost.

A system employing a pair of decoders at each selection point would have a direct capacity of 64 selection points. The addition of a third decoder with the required additional three selection lines in the selection cable would increase the selection capacity to 512 points. The capacity of the system thus increases rapidly and is particularly adapted to the direct connection of the selection points as a single group, although if desired the code system of this invention might be applied to the subgrouping system.

In certain applications, the increased capacity effected by the addition of a decoder may be far in excess of the immediate or projected future needs of the system. Rather than providing the additional decoder, the present invention can be readily extended in capacity by grouping of the pickup points and by multiplexing a centrally located power supply, the control of local power supplies, or the decoding circuits, with either a central or local power means, for separately and individually enabling the several groups of pickup points.

If the anticipated capactiy is intermediate that of a two card and a three card system, the application of a three card system may be inefficient. In accordance with an aspect of the present invention, a central power supply may be provided and selectively connected to separate power wires or separate portions of one wire incorporated in the selection cable system during the initial wiring system. The power wires drive the complement of decoding stations only half of which are energized at any given instance.

The addition of each power wire increases the capacity of the two card, six wire system or any other system by a factor of improvement equal to the total number of power wires and provides a convenient and relatively inexpensive means of expanding system capacity. The future expansion of a given installation can therefore be economically established with a minimum of present wiring and number of decoder circuits or cards.

The above multiplied power system requires a central power source. If local power sources are required, the system may include means for controlling the power sources, or the decoding circuits, of related groups of pickup points. A simple and inexpensive means is provided by selectively grounding disabling means such as a disabling diode in each decoding unit or circuit. Disabling wires are provided as a part of the selection cable and each is connected to a different group of the decoders, presently or in the future when subsequent selection points are added to the system. The disabling wires are selectively and individually grounded at the control center and disable all but one of the groups of decoding circuits and associated controlled locations and points.

The present invention thus provides a new and novel application of the binary coded logic which can be efficiently designed for anticipated future expansion and with a substantial simplification, greater flexibility and reduced cost while retaining the advantages of life, ruggedness, and reliability of construction.

The drawings furnished herewith illustrate the best mode presently contemplated for carrying out the invention.

Figure 1:
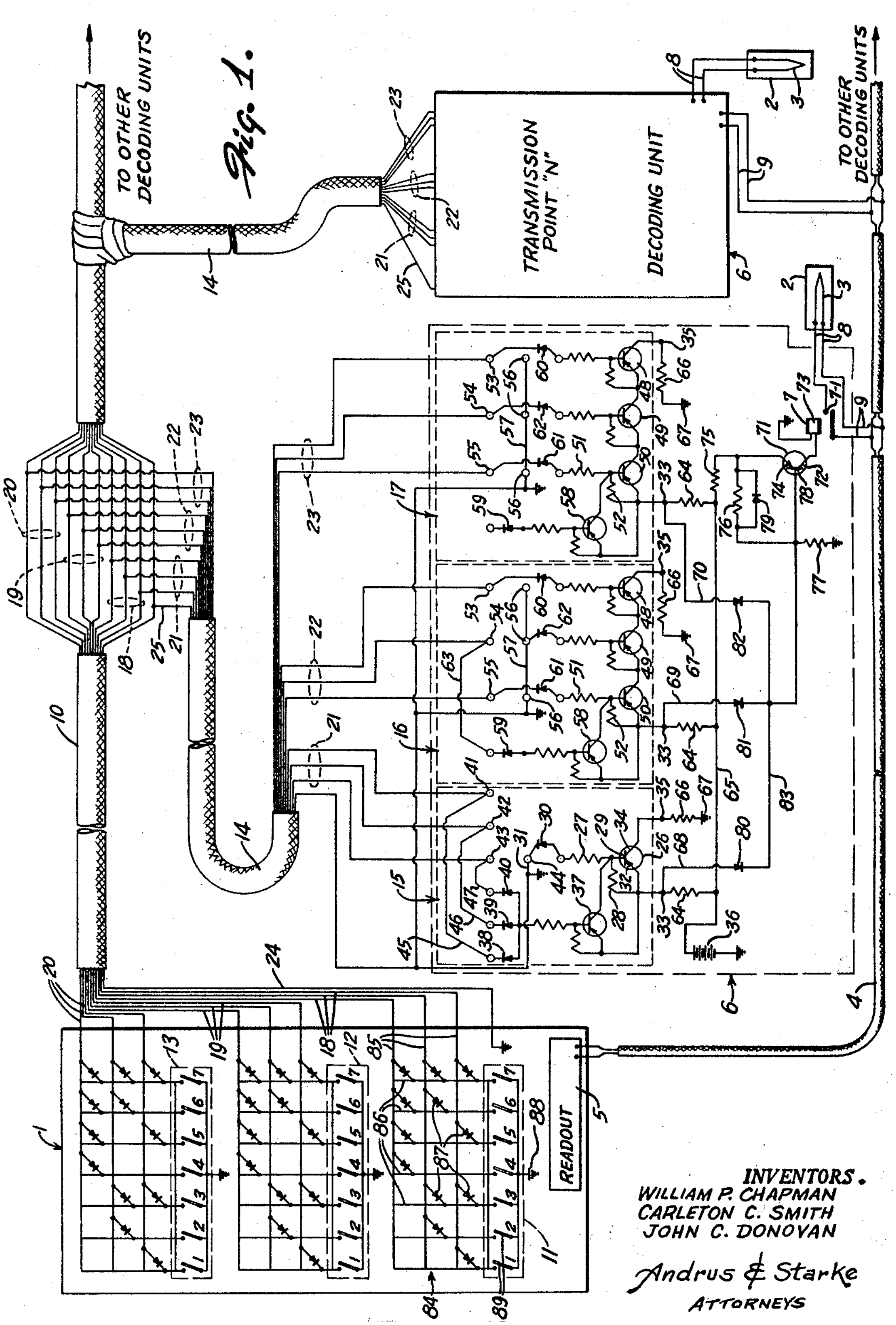
FIG. 1 is a schematic circuit diagram of a nine selection wire, three card selection system constructed in accordance with the present invention.

Referring to the drawings and particularly to FIG. 1, a temperature monitoring system is illustrated including a control center 1 provided at a convenient location and at which temperature information is to be selectively gathered from a plurality of scattered data transmission locations or points 2 under control at the control center. The data transmission points 2 will generally be located in a related area such as a building, not shown, remote from the control center. Only a pair of the selection points are illustrated in the drawings for purposes of simplicity although the illustrated embodiment of the invention has a capacity of directly selecting 512 different points 2. A thermocouple 3 at each transmission point 2 constitutes a signal generator for generating a temperature responsive signal which is selectively transmitted to the control center via a common data transmission cable 4. A temperature recording or readout unit 5 is connected to cable 4 and actuated by the temperature responsive signals. In certain applications, each of the transmission points 2 may include a plurality of thermocouples which are connected to individual transmission lines in the cable 4 for selective and individual connection to the temperature readout unit 5 as shown in the previously referred to copending application of Chapman and Smith, for example. In either event, the thermocouple 3 at each transmission point 2 is connected to the transmission cable 4 by a related decoding unit 6. A pair of contacts 7–1 of a relay 7 which constitutes the output control of the decoding unit 6 connects input lines 8 from the thermocouple 3 to output lines 9 which are connected to the transmission cable 4. When contacts 7–1 of relay 7 close, the corresponding thermocouple 3 transmits the signal to the cable 4 and thus to the readout unit 5 for individual review or recording at the control center 1.

A common selection cable 10 extends from the control center 1 to each of the transmission points 2. The selection cable 10 is connected at the control center 1 to three separate encoding panels 11, 12 and 13 each of which is related to a significant position in a three character code for identifying the selection points 2. Separate coupling cables 14 interconnect the selection cable 10 to each of the decoding units 6. The decoding selection units 6 are coded electrically to respond to a predetermined input established on cable 10 by encoding panels 11, 12 and 13. The code employed is a three position number and employs an octal numbering system having the base eight and employing the digits 0 through 7, inclusive. Each code position may thus be electrically represented or coded by the appropriately related three-bit binary number for binary logic coding of decoding units 6, as follows.

Each decoding unit 6 of which only one is shown in detail includes three binary decoders 15, 16 and 17 which are controlled respectively by the encoding panels 11, 12 and 13, as more fully described hereinafter. Each of the binary decoders 15, 16 and 17 is electrically coded to and represents a significant position in the octal counting system employed herein. Decoder 17 is related to the one or first weighted position, decoder 16 is related to the eight weighted position and decoder 15 is related to the sixty four weighted position of the octal counting system. Each decoding unit 6 may thus be uniquely coded to any one of the 512 possible combinations which constitute the capacity of selection points for the embodiment of the invention as illustrated in FIG. 1.

The decoding unit 6 shown in detail in FIG. 1 is related to the octal number 057 and decoder 15 is coded to the binary number 000 corresponding to digit 0, decoder 16 is coded to the binary number 101 corresponding to the digit 5 and the decoder 17 is coded to the binary number 111 corresponding to the digit 7.

The selection cable 10 includes separate groups of selection lines 18, 19, and 20 for connection respectively tothe panels 11, 12 and 13, and to corresponding decoders 15, 16 and 17 by related groups of coupling selection lines 21, 22 and 23. Each selection line of each group is related to one of the binary bits. Ground wires 24 and 25 are also provided respectively in cables 10 and 14.

Each of the binary decoders 15, 16 and 17 may be individually constructed for coded response or a single module may be constructed with similar components and field connected for the desired coded response. FIG. 1 illustrates the present invention with the improvement in construction of the several decoders as multiple functioning units in accordance with permutations of the zeros and the ones in the three bit binary code. In FIG. 1, binary decoder 15 is constructed to be coded to the binary numbers 000, 001, 010 and 100 and is constructed somewhat differently than the binary decoders 16 and 17 which may be coded to the binary numbers 011, 101, 110 and 111.

Decoder 15 which is coded to the digit 0 includes a single decoding transistor 26 and a pair of series connected input resistors 27 and 28 forming a voltage dividing network with the midpoint connected to the base 29 of transistor 26. One end of the series connected resistor 27 and 28 forms an input connected in the illustrated embodiment of the invention by a diode 30 to a ground line 31. The opposite end of the series-connected resistors 27 and 28 is connected to the emitter 32 of transistor 26 and common input and output terminal 33. Transistor 26 includes a collector 34 connected to form a second output terminal 35.

A local power source shown as a battery 36, provides bias current to the respective transistors on the various decoders 15, 16 and 17 at each transmission point and a suitable output voltage for operating the relay 7, as hereinafter described.

A disconnect or disabling transistor 37 is provided generally in accordance with the teaching of the previously referred to copending application of Chapman and Smith and includes an input and output circuit generally corresponding to the decoding transistor 26 with the output connected across the resistor 28. Three disconnect or disabling diodes 38, 39 and 40 are individually and separately connected to form three input terminals to disabling transistor 37. In the absence of an input signal via one of the diodes, transistor 37 is biased to cutoff and does not effect the operation of decoding transistor 26. When disabling transistor 37 is however biased to conduct as a result of the proper grounding at diodes 38, 39 or 40, the output short circuits the resistor 28 and prevents conduction through decoding transistor 26 and disables the decoder 15.

Three selection line terminals 41, 42 and 43 and a ground terminal 44 are connected by coupling cable 14 to the selection cable 10 and to either the diodes 38, 39, 40 or the decoding transistor input depending on the code digit and to ground line 25. Decoder 15 is related to the digit zero and is conditions to conduct by the direct connection to ground by diode 30. If a coded input is presented at terminals 41, 42 and 43 of decoder 15 corresponding to an identification code having a digit other than 0 in the corresponding position, the decoding transistor 26 is disabled as follows.

Jumper leads 45, 46 and 47 connect the three diodes 38, 39 and 40 individually to the respective line terminals 41, 42 and 43. A signal on any one of the selection line terminals 41, 42 and 43 causes the disabling transistor 37 to conduct and disable the decoding transistor 26.

At other transmission points 2, decoder 15 may be coded to digits 0, 1, 2 or 4 with the circuit corresponding to that shown in FIG. 1 by encoding to the corresponding binary numbers 000, 001, 010 or 100. Where the digit 1, 2 or 4 is employed, the input terminal is connected to the selection line terminal 41, 42 or 43 corresponding to the position of the digit 1 in the binary representation. The other two terminals are connected to the corresponding disabling diodes. If a different code digit is assigned to the position of decoder 15, the circuit of decoders 16 and 17 will be employed.

Decoders 16 and 17 are similarly constructed to accept any one of the binary number representations 011, 101, 110 and 111 for the code digits 3, 5, 6 and 7. The difference in the code response of decoders 16 and 17 is controlled by the interconnection of the several similar elements therein. Decoder 16 which is related to the binary number 101 and the digit 5 is described in detail and the difference is in the connection between the decoders 16 and 17 are subsequently described.

Decoder 16 includes three decoding transistors 48, 49 and 50 connected in an AND logic circuit to provide an operative output only when all three of the transistors are conducting. Each of the transistors has an input control circuit including input resistors 51 and 52 connected in a voltage divider circuit in accordance with the connection of resistors 27 and 28 of the decoder 15. Three selection line terminals 53, 54 and 55 are connected to the appropriate lines of cable 14 and thus cable 10. Three ground terminals 56 are connected to a ground line 57 for connection to decoding transistors coded to the binary bit 0. A single disabling transistor 58 similar to disabling transistor 37, is connected to the decoding transistor 50 for selective disabling of the decoder 16. A single disabling diode 59 is connected in the input circuit of transistor 58 for selective biasng thereof to conduct.

The decoder 16 is coded to the digit 5 of the octal code 057 and thus to binary number 101. Diodes 60 and 61 connect the respective decoding transistors 50 and 48 to the corresponding terminals 55 and 53 and prevent conduction in the absence of a proper signal at the terminals. Transistors 48 and 50 are thereby properly coded to the binary bit 1. A diode 62 connects the transistor 49 to the ground line 57 and conditions the transistor 49 to conduct whenever transistors 48 and 50 are similarly conditioned. Transistor 49 is thereby properly coded to the binary bit 0. When an appropriate selection signal is established in cable 10 and cable 14, decoding transistors 48 and 50 are also biased to conduct and complete the output circuit of the decoder 16, which appear at the output terminals corresponding to terminals 33 and 35 of decoder 15. A disabling jumper lead 63 connects the disabling diode 59 to the intermediate terminal 54. Encoding a different binary number on cables 10 and 14 for decoder 16 which, simultaneously with the biasing of the decoding transistors 48 and 50 to conduit, establishes a signal on the terminal 54 corresponding to decoding transistor 49 causes the disabling transistor 58 to conduct and disable the decoder 16.

The decoder 17 is similar in construction to decoder 16 and corresponding components are referred to by corresponding numbers for simplicity and clarity of explanation. Decoder 17 is shown however coded to the binary number 111 and the digit 7. Diode 62 therefore is inserted connecting the transistor 49 to the input selection line terminal 54 and the connection of the disabling diode 59 to the terminal 54 is absent. The decoder 17 is therefore biased to establish an output only when individual signals are applied to all three lines 53, 54 and 55 and bias all decoding transistors 48, 49 and 50 to conduct. As this constitutes the maximum binary application in the illustrated embodiment of the invention, the disabling transistor 58 is not connected in the circuit.

The three decoders 15, 16 and 17 each represent a binary combination and the decoders are connected by similar load circuits, with corresponding elements in the three load circuits therefore similarly numbered, in a separate AND logic control circuit to energize relay 7 only when all three of the decoders are properly actuated by proper encoding of selection cable 10 in accordance with the identifica.ion code for the corresponding selection point as follows.

Similar load resistors 64 are separately connected to a lead 65 which is connected to the positive side of the power source 36 and to corresponding terminal 33 of the respective decoders 15, 16 and 17. Three resistors 66 which are relatively small in comparison to resistors 64 are connected one each to the output terminal 35 of the respective decoders 15, 16 and 17 and to grounds 67. Output leads 68, 69 and 70 are separately connected to the respective output terminal 33 and the voltage on leads 68, 69 and 70 conjointly control an output transistor 71, the load circuit of which includes relay 7.

When the decoders 15, 16 and 17 of a given point 2 are selected, the decoding unit 6 conducts and the voltage at the output leads 68, 69 and 70 approaches zero the resistor 66 establishes a small voltage at the emitter 32 for maintaining the operating bias on transistor 26. In the absence of selection of any one of the decoders 15, 16 and 17, the output voltage of the corresponding decoder is the full source voltage.

The output transistor 71 includes a collector 72 connected in series with a relay coil 73 of relay 7 to ground. An emitter 74 of the transistor 71 is connected in series with a resistor 75 to the power source 36. Bias resistors 76 and 77 are connected in series between the emitter 74 and ground with the midpoint between the resistors connected to the base 78 of the output transistor 71. A diode 79 is connected in parallel with the resistor 76 and prevents the base voltage from exceeding the emitter voltage and damaging the transistor. The output leads 68, 69 and 70 of the decoders 15, 16 and 17 are individually separately connected to the base 78 by respective coupling diodes 80, 81 and 82 having a common line 83 connected to base 78. The transistor 71 functions as a normally open switch as long as any one of the decoders 15, 16 and 17 is biased to cutoff and supplies a relatively large voltage via the corresponding coupling diode to the transistor. However, if all of the decoder outputs are at a zero voltage level as a result of selection of the related point 2, the diodes 80, 81 and 82 effectively decouple the circuits. As a result, the voltage across bias resistors 76 and 77 properly bias the transistor 71 to conduct and complete the circuit to operate the relay 7, in accordance with the proper encoding of selection cable 10 by panels 11, 12 and 13 at the control center 1 for operation of the associated decoder unit 6.

The selection cable 10 includes the three groups 18, 19 and 20 of three selection lines each and the ground wire 24 which are properly connected respectively to panels 11, 12 and 13 and to the decoders 15, 16 and 17 at the various data transmission points 2.

Each of the panels 11, 12 and 13 is similarly constructed in accordance with the previously referred to copending application of Chapman and Smith and panel 11 will be briefly described.

The panel 11 includes a diode matrix 84 having three output lines 85 connected respectively one each to each of the three selection lines of group 18 of cable 10. Seven input lines 86 one for each of the binary numbers following the initial binary number 000 are provided and interconnected to the three output lines by coupling diodes 87. Each of the lines 88 is connected to the output lines 85 by a diode 87 in accordance with the presence and location of the digit 1 in the binary number. A common ground 88 is provided and connected to each of the input lines 86 by a separate and individual switch 89. Panel 11 thereby allows encoding of the three selection lines of group 18 in accordance with each of the binary numbers following the binary number 000 corresponding to the digit 0.

In the illustrated embodiment of the invention the initial binary number 0 which includes only zeros has each of the elements or transistors biased to conduct within the decoder 15, 16 or 17 and thus a signal does not have to be established corresponding thereto. If it is desired, of course, a blank switch can be provided such that at all times, the operator actuates all three panels 11, 12 and 13.

Panels 12 and 13 are similarly constructed for encoding of the corresponding selection line groups 19 and 20 for actuating of selected decoders 16 and 17.

In summary, the detailed decoding circuit of FIG. 1 is set for the code number 057 and the decoders 15, 16 and 17 each includes an individual AND circuit corresponding to the binary representation of the digits and a NOR circuit to prevent erroneous operation upon encoding of another binary number. The assigned transmission point 2 is properly connected without operation of panel 11 and with actuation of the fifth switch and the seventh switch in the panels 12 and 13.

In accordance with the present invention, the binary encoded logic is applied to a control system with a unique counting system permitting control or selection of a substantial number of points and particularly adapted to a system with a large capacity of selection points. In the present invention however as each location requires a number of different cards, the practicality and commercial utility relates to the economical and mass production of decoders which can be rapidly installed and maintained with a minimal skill and experience.

Figure 2:
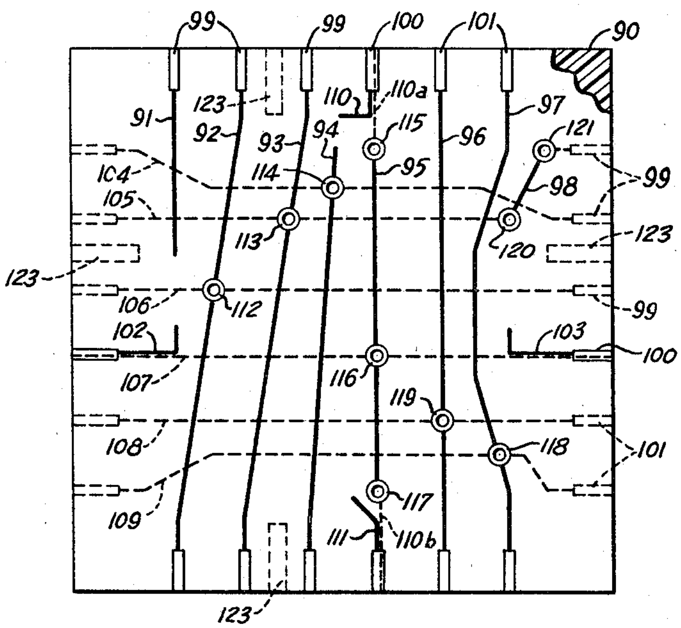
FIG. 2 is a plan diagrammatic view of a basic decoder card constructed in accordance with the present invention for application in the system of FIG. 1.
Figure 4:
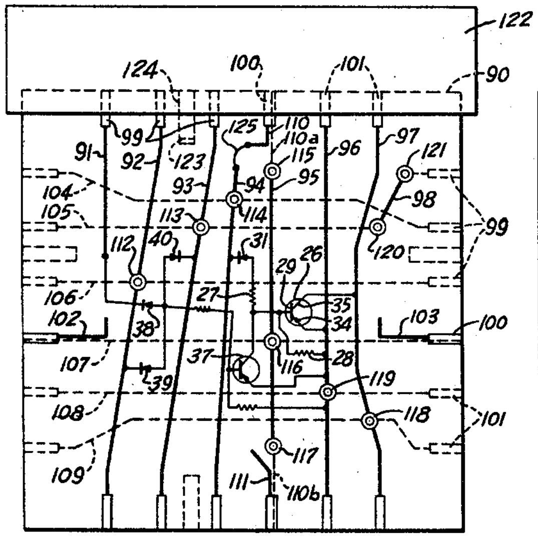
FIG. 4 is a view similar to FIG. 3 with the components added and connected for representation of the binary numbers 011, 101, 110 and 111.
Figure 3:
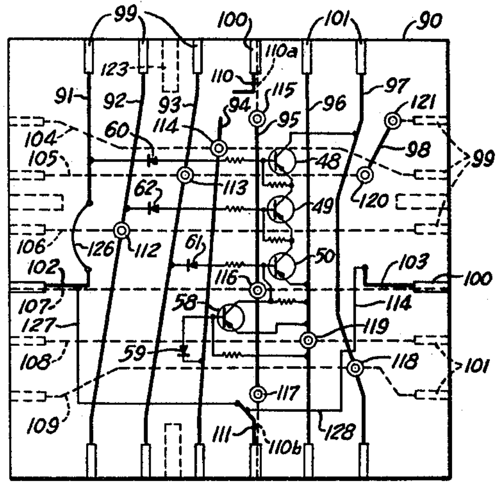
FIG. 3 is a card construction similar to that shown in FIG. 2 with the components added for representation of the three binary numbers 000, 010, 001 and 100.

FIGS. 2–4 illustrate a printed circuit configuration whereby an inventory of only two cards allows rapid connection of all possible codes in the system illustrated in FIG. 1 without necessity of unusual skills or experience. The structures of FIGS. 2–4 are based on the concept that the combination of the three bit binary code can be divided into a pair of multiple functioning binary representing code cards one of which accepts the binary input 000 and the binary inputs consisting of all three permutations of two zeros and a one and the other of which accepts the binary input 111 and the binary inputs consisting of all three permutations of two ones and a zero.

Referring particularly to FIG. 2, a printed circuit decoder card 90 is diagrammatically illustrated. The illustrated card 90 is adapted for forming of a pair of decoder cards each of which can accept four of the different combinations of the binary bits in a three bit binary code and thus by the production and inventory of two simple cards the necessary decoders for the complete system are established.

The card 90 is formed of a suitable insulating material and includes on one side thereof a plurality of generally vertical printed lines or conductors 91–98, inclusive, some of which extend to and terminate in 6 printed terminals in the upper and lower edges. The edge terminals constitute three selection line inputs 99 and a ground line input 100 corresponding to the selection cable terminals of FIG. 1 and a pair of output terminals 101 corresponding to the output terminals of each decoder 15, 16 and 17 of FIG. 1. A pair of short horizontal printed conductors 102 and 103 are provided on the same side of the card 90 in the middle of the side edges and terminate in similar printed terminals. Generally horizontal conductors 104 through 109, inclusive, are similarly formed on the underside of the card 90 and terminate in printed terminal pins providing corresponding input terminals 99 and 100 and output terminals 101. The terminals associated with horizontal lines or conductors 102 and 103 are aligned with the ground wire terminal 100 on the underside of the card.

A pair of vertical conductors 110 and 111 are printed in the upper and lower portions of the top side of the illustrated card 90 and terminate in the ground wire terminals 100 on the upper and lower edges of the top side of the card.

A plurality of eyelets 112–121 interconnect the horizontal and vertical conductors as hereinafter described for proper coding connections of the input and output. A cooperating six socket receptacle 122, shown in FIG. 3, is connected to the lines of cable 14 and to the input terminals of the load circuit. A cooperating notch 123 in card 90 and projection 124 in socket receptacle assures insertion of the card 90 with the input terminals 99 and 100 connected to the input side of the receptacle 122 and the output terminals 101 to the output side thereof. Receptacle 122 is of any suitable or conventional construction and no further description thereof is given.

The card 90 of FIG. 2 also includes a pair of vertical conductors 122A and 122B printed on the underside thereof between the ground terminals 100 in the upper and lower edges respectively and the eyelets 115 and 117. The conductors 122A and 122B are provided to provide a grounded point on the board for test purposes and the like.

FIG. 3 diagrammatically illustrates a card 90 corresponding to that of FIG. 2 wired to accept the binary numbers including the three zeros and all permutations of two zeros and a one and the added wired elements are numbered in accordance with the corresponding elements of decoder 15 in FIG. 1. The elements and components hereafter described are shown to the top side of card 90 for clarity of illustration. In practice, the elements would normally be disposed to the underside of the card with the terminals projected through suitable openings for soldering or the like.

In FIG. 3, the card 90 is shown wired for the binary number 000 on the top edge, as follows. The jumper lead 125 interconnects the lines 94 and 110 which are connected to the ground terminal 100 in the top edge of card 90. The decoding transistor 26 has the input or base 29 connected to the grounded line 94 by the steering diode 31 and has its collector 35 connected to the line 97 which terminates in an output terminal 101. The emitter 34 of transistor 26 is connected to the opposite ouput terminal 101 via line 96. The disabling transistor 37 is connected across the decoding transistor 26 and is connected to the three selection line terminals 99 by the steering diodes 38, 39 and 40 which are connected respectively to the printed conductors 91, 92 and 93. With the card 90 plugged into the socket receptacle 122 as shown in FIG. 3, the three selection lines of group 18 are connected respectively to the disenabling transistor 37 and ground line 24 is connected to the decoding transistor 26. The output terminals 101 are connected in the output control circuit, as previously described.

The wiring of card 90 as shown in FIG. 3 establishes the binary number 010 at the terminals on the right edge thereof when inserted in the receptacle 122. In this connection, the three selection line terminals 99 are connected respectively beginning with the uppermost terminal as follows: The top terminal 99 is connected via the eyelet 121, vertical line 98 and horizontal line 105 to the vertical line 93 to which the disenabling diode 40 is connected. The first terminal 99 is thus coded to the binary bit 0 as required. The second selection line terminal 99 is connected via the printed conductor 104 and eyelet 114 to the conductor 94 to which the steering diode 31 to which the decoding transistor 26 is connected. The second terminal 99 is thus coded to the binary bit one as required. The third selection line terminal 99 is connected by conductor 106 and the eyelet 112 to printed conductor 92 to which the disabling diode 39 to which the disabling transistor 37 is connected. The third terminal is thus coded to the corresponding binary bit 0 as required. The ground terminal 100 is not connected in the circuit in accordance with the desired functioning thereof. The uppermost output terminal 101 on the right edge in FIG. 3 is connected by conductor 108 and eyelet 119 to vertical printed conductor 96 to which the emitter of the decoding transistor 26 is connected. The associated lowermost terminal 101 is connected by the printed conductor 109 and eyelet 118, to printed conductor 97 to which the collector 35 of the decoding transistor 26 is connected. The output terminals 101 are thereby connected in the output control circuit as previously described.

Similarly, the bottom edge terminals are coded to the binary number 001 and the left edge terminals are coded to the binary number 100.

In practice, the binary representation is identified on the four sides of card 90 by the appropriate digit 0, 1, 2 and 4, respectively, or any other suitable character, not shown, for simplicity of installation and the like.

Where the assigned code number includes one of the other four digits 3, 5, 6 and 7, such as in the circuit of FIG. 1, a code card 90 constructed as shown in FIG. 4, is used. Referring particularly to FIG. 4, the basic code card 90 of FIG. 2 is employed with three decoding transistors 48, 49 and 50 and the diodes 60, 62 and 61 are provided in accordance with the coding circuits shown in FIG. 1. A jumper lead 126 interconnects the printed ground conductor 102 to the vertical printed conductor 91. A second jumper lead 127 connects the ground conductor 102 to the ground conductor 111 on the lower top edge of card 90 and a third jumper lead 128 interconnects the latter ground conductor 111 to the ground conductor 103.

In FIG. 4, the card 90 is positioned with the encoded circuit corresponding to represent binary number 111 on the top edge, 101 on the right edge, 110 on the lower edge and 011 on the left edge.

Referring particularly to the binary bit 111 on the upper edge, the circuit is traced as follows: The three decoding transistors 48, 49 and 50 are connected in a series output circuit with the collector of the transistor 48 connected to the vertical printed conductor 97 and thus to an output terminal 101 at the upper edge of the card 90. The emitter of the transistor 50 is connected to the vertical printed conductor 96 and thus to the opposite output terminal 101 on the upper edge for connection in the output control circuit when the card 90 is plugged in a receptacle 122. The decoding transistor 48 is connected to the printed conductor 91 by diode 60 and thus to the first selection line input terminal 99 and similarly decoding transistors 49 and 50 have their inputs connected respectively to conductors 92 and 93 by the respective diodes 62 and 61 and thus to the other two input terminals 99. The three selection lines of cable 10 are connected to the input of the three decoding transistors 48, 49 and 50 and the circuit between terminals 101 remains open until such time as a proper signal is applied to cause all three transistors to conduct.

The disenabling transistor 58 is connected in a circuit adapted to short circuit the bias of decoding transistor 50 and is connected by the diode 59 to the vertical printed conductor 95 which is an open circuit for binary representation 111. Conductor 94 is not operatively connected in the circuit when the upper edge is inserted in the receptacle 122 and the circuit is wired or coded to the binary number 111 as shown in decoder 17 of FIG. 1.

When the right edge of the card of FIG. 4 is inserted in the receptacle 122, the decoding transistors 48, 49 and 50 and the disenabling transistor 58 are connected in the circuit as follows: The uppermost selection line terminal on the right edge of FIG. 4 is connected by eyelet 121 and conductors 98 and 105 to the eyelet 113 which joins the conductor 93 to which the decoding transistor 50 is connected by the associated diode 61. The first terminal 99 is thus encoded to binary digit 1 as required. The next input or selection line terminal 99 is connected by the conductor 104 and the eyelet 114 to the conductor 94 to which the disabling diode 59 connects the disabling transistor 58. The second selection line terminal 99 is thus coded to the binary digit 0, as required. The third selection line terminal 99 is connected by conductor 106 and the eyelet 112 to conductor 92 to which the decoding transistor 49 is connected by the diode 62. The third position of the binary number is thus coded to the binary digit one, as required. The ground terminal 100 is connected by the jumper leads 128, 127 and 126 to the conductor 91 to which is connected the decoding transistor 48 by the diode 60. Decoding transistor 48 is biased to conduct and the decoder corresponds to the decoder 16 of FIG. 1 for binary representation 101 and code digit 5.

Similarly, the encoding for binary number 110 and 011 may be traced from the terminals on the lower edge and the left edge of the card 90 in FIG. 4.

The code cards 90 of FIGS. 2–4 are inexpensive and rapidly made and thus particularly adapt the binary system control as shown in the illustrated embodiment of the invention of FIG. 1 to commercial use. The code system employing the two code cards can be installed and prepared with personnel of very minimum skill in view of the simple identification of the code on the cards.

Rather than employing a three position code as in FIG. 1, a two position code might be employed with only a pair of code cards provided at each transmission point. The two card system has the advantage over the three card system of requiring a substantially less number of code cards and selection lines. However, this allows selection of only 64 different selection points whereas the embodiment shown in FIG. 3 allows selection of 512 points. If the selection system requires more than 64, but substantially less than 512 selection points, the two card system can be employed with either of the alternative concepts of the present invention as illustrated in FIGS. 5 and 6.

Figure 5:
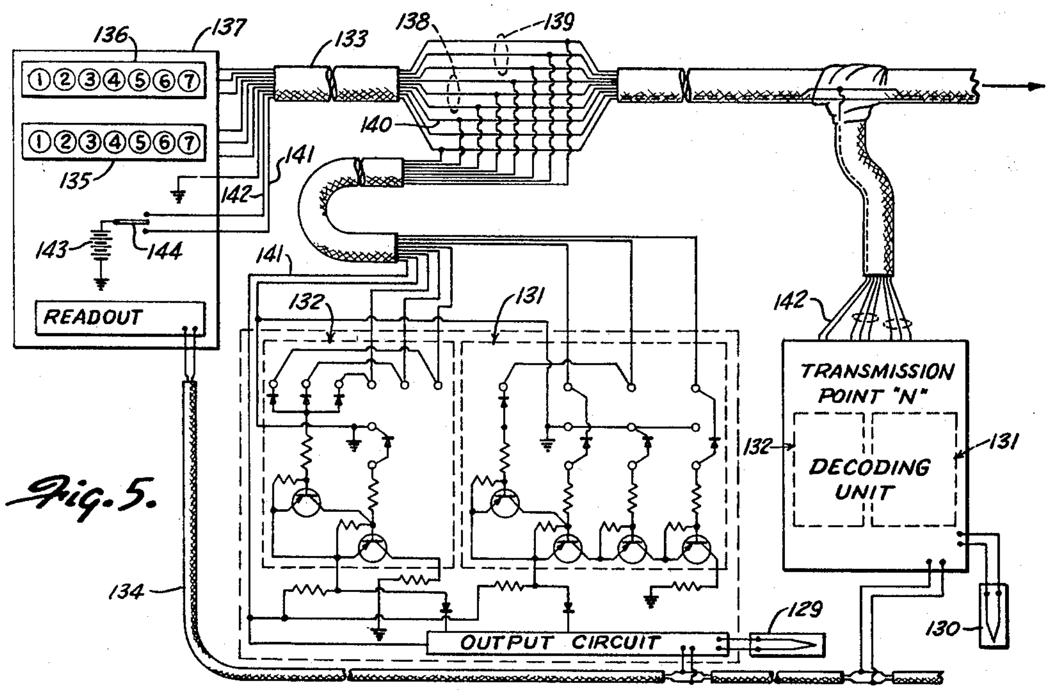
FIG. 5 is a schematic circuit diagram of a six selection wire, two card selection system showing an alternative construction employing a centrally located power source in accordance with another aspect of the present invention.
Figure 6:
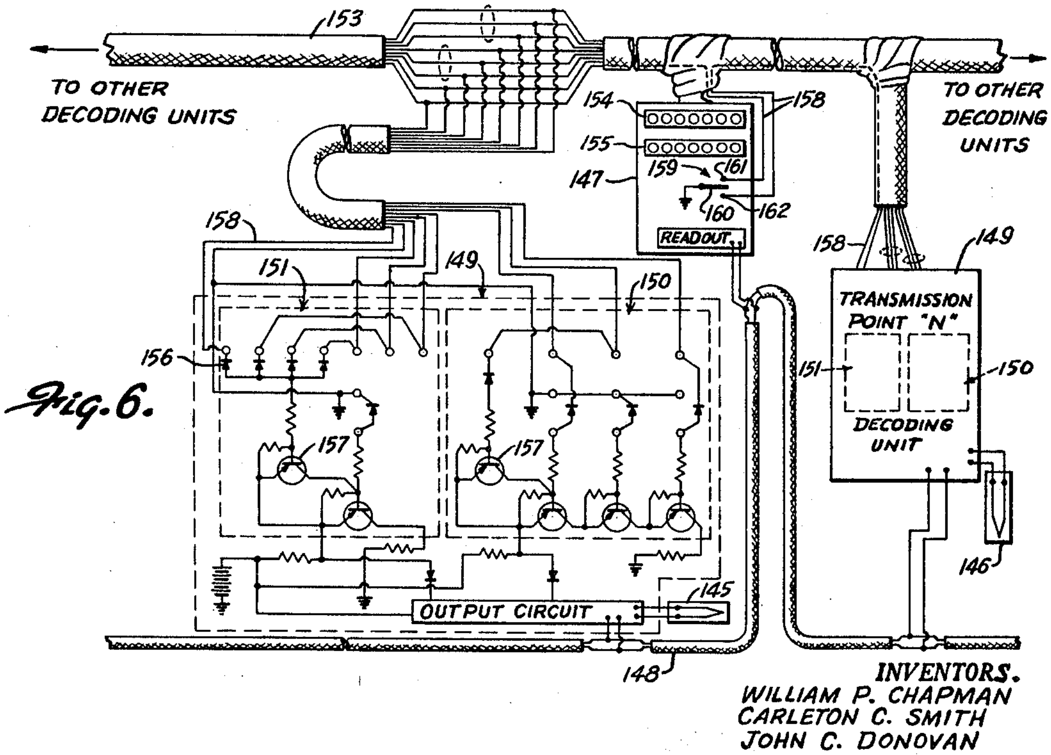
FIG. 6 is a circuit diagram of still another two card system employing local power sources and decoder group disenabling means.

Referring particularly to FIG. 5, a two card six selection wire system is shown with a central multiplied power supply for extending the capacity of the two card system. In FIG. 5, a pair of transmission points 129 and 130, which constitute only two of many transmission points, is illustrated. Each transmission point 129 and 130 in accordance with the previously described embodiment is controlled by a decoding unit which includes a first significant position card decoder 131 and a second significant position card decoder 132. The decoders 131 and 132 are constructed and coded in the same manner as the decoders heretofore described and no further detailed description thereof is given. A selection cable 133 and a transmission cable 134 are also connected between each and every point including points 129 and 130 and control panels 135 and 136 at a control center 137.

The selection cable 133 includes a pair of selection line groups 138 and 139 for operating the decoders 131 and 132 and a common ground line 140 is incorporated in the selection cable 133.

In the embodiment of the invention illustrated in FIG. 5, a pair of power distribution lines 141 and 142 are incorporated as a part of the selection cable 133. At the control center 137, a common power source 143 is provided and replaces all the local power sources shown in FIG. 1 for operation of all decoding units. The common power source 143 is selectively connected to the power distribution lines 141 and 142 by a single-pole double-throw switch 144. The transmission points are divided into two groups, one of which is represented by point 129 and the other by point 130.

The power distribution line 141 is connected to the decoding circuit or unit of each transmission point grouped with the transmission point 129. The alternate distribution line 142 is connected to the decoding circuit or unit of each transmission point grouped with selection point 130. Power is applied at any one time to either one of the power distribution lines 141 and 142. Consequently, half of the decoding units are conditioned for operation at any given time and the two groups of 64 points can be independently and uniquely selected, thereby doubling the capacity of the system.

If further capacity is desired, still a third distribution line, not shown, could be provided for selective connection to source 143 and connected to a third group of transmission points. This system is particularly adapted to a control system having a generally centrally located control center with respect to the transmission points. The selection cable may then include a single power distribution line broken at the control center and extending in different directions to the selected groups.

A central power source can be efficiently used to transmit power from a central location for only certain distances. In some installations, therefore, a localized power system is practically an essential requirement. The embodiment of the invention shown in FIG. 6 illustrates a multiplexing control for groups of decoding circuits having local power supplies and also illustrates the concept of providing a control center centrally located within groups of controlled points.

Referring particularly to FIG. 6, a pair of transmission points 145 and 146 are shown as representative of a pair of groups of selection points which are grouped on opposite sides of a control center 147. A transmission cable 148 extends to either side of the control center 147 for a selective connection to the groups represented by points 145 and 146. At each selection point, a decoding circuit 149 is provided including a first significant position card decoder 150 and a second position card decoder 151 and a local power source 152. A selection cable 153 extends in opposite directions from control panels 154 and 155 at the control center 147 for actuation of the decoders 150 and 151.

In accordance with the invention as shown in FIG. 6, each decoder includes a group disconnect or disabling diode 156 which is connected to the disabling transistor 157 which operates as heretofore described. A group disenabling line 158 is formed as an integral part of the selection line cable 153 and is connected to either both or one of the disabling diodes 156 of decoders 150 and 151. The line 158 is broken at the control center to form two connections to a single-pole double-throw switch 159 at the control center.

The switch 159 includes a common pole 160 which is connected to ground and engaged with either of a pair of contacts 161 and 162 which are connected to the broken ends of line 158 for grounding the opposite side of the disabling line 158. The selection system of FIG. 6 operates generally in accordance with the system of FIG. 5. However, the groups are selectively enabled by positioning switch 159 to ground one or the other portions of line 158 and the corresponding diodes 156 rather than controlled connecting of a common power supply as in FIG. 5. In both systems, half of the total transmission points is enabled and the other half is disabled.

The advantage of the circuit shown in FIG. 6 is the elimination of the central power supply and the accompanying problems of power distribution distances and power wires. Although the system of FIG. 6 requires an addition of 128 diodes for full capacity application, diodes are extremely inexpensive components and do not appreciably increase the total cost of the system.

The present invention has been particularly described in connection with a three bit binary code and with an octal counting system in order to employ the full capacity of the three bit binary code. In certain unique applications, it may be desirable to count by some other base either with a three bit binary code or some other greater or lesser bit binary code. If the three bit binary code is employed with a different counting base, the full capacity of the system is not used with a resulting inefficiency. A greater binary bit code requires an additional decoder at each controlled point and increases the cost of the system. Further, each decoder is somewhat more complex and consequently more expensive. Similarly, although the present invention has been particularly decribed in connection with the selection of a plurality of remote transmitting means for monitoring of a temperature sensitive system or the like, the present invention may also be applied equally to gathering of any other type of information or might be applied directly as a control means for remote processes and mechanisms.

The present invention thus provides a very flexible and novel application of a binary code system and is particularly adapted to providing a direct selection and control of any one of a plurality of remote points. Multi-purpose code modules of cards of the present invention make the direct connection application practical and economical both from the standpoint of original design and installation as well as subsequent servicing and maintenance of the system.

The present invention thus provides a new and novel binary control system in which the design installation and maintenance are maintained at minimum cost and complexity while providing an extremely flexible system which can be adapted to selection of widely differing capacities.

Various modes of carrying out the invention are contemplated as being within the scope of the following claims particularly pointing out and distinctly claiming the subject matter which is regarded as the invention.

We claim:

1. In a binary logic coded control employing a multiple character identification code for each of a plurality of controlled means, said code having a plurality of significant positions each of which includes any one of a group of multiple position binary representations, (a) a plurality of decoding circuits one for each controlled means assigned a predetermined unique identification code, each decoding circuit including a separate decoder for each significant position and each decoder having decoding means responsive to a multiple position encoded input corresponding to a designated multiple position binary representation of said group of binary representations, (b) a selection line cable for operating said decoders and having a separate line for each position in said binary representation, and (c) encoding means connected to said selection lines for establishing operating conditions on said selection lines corresponding to one of said identification codes for actuating the corresponding decoders.

2. In a binary logic coded control of claim 1 wherein (a) the first eight significant numbers of a binary counting system characterized by permutations of 0s and 1s represent the characters of the several significant positions of the identification code, (b) said decoders for the characters related to the binary numbers 000, 001, 010 and 100 include a decoding element forming an output logic control of the decoder and at least three disconnect elements connected to disable said decoding element, and (c) said decoders for the characters related to the binary numbers 011, 101, 110 and 111 include three decoding elements connected in an output logic control and at least one disconnect element connected to at least one of the decoding elements for selectively disabling the same and thereby said output control.

3. The control constructed in accordance with claim 1 wherein, (a) said selection line cable includes separate groups of selection lines one for each of said corresponding decoders in the plurality of decoding circuits, and (b) said encoding means includes separate and similar group encoding means for each of said groups of selection lines, each group encoding means having a single input means for each character of said identification code.

4. In the binary logic coded control of claim 1, (a) each of said decoding circuits having said decoders interconnected to establish individual outputs, (b) a load circuit for each decoder having an output lead adapted to be connected to a power source in series with a resistance element and having the corresponding decoder connected as a switching element therein for selectively grounding the output lead, and (c) an output circuit including an output control element individually connected to each output lead and responsive to a predetermined corresponding electrical condition on each of said output leads to form an AND logic output circuit.

5. In a binary-octal coded control having a multiple position identification number to the base eight and employing the first eight three bit binary number representations of the binary counting system in each position, (a) a decoding circuit having a separately coded circuit for each of the positions in said identification number having a plurality of electroresponsive means coded to respond to one of said binary numbers, (b) a selection cable including groups of selection lines, each group including three selection lines one for each binary bit and being operatively connected to the electroresponsive means of a corresponding coded circuit of the decoding circuit, and (c) encoding means connected to said groups of selection lines for selective electrical encoding on each group one of the first eight binary number representations of the binary counting system.

6. The binary-octal coded control of claim 5 having said three bit binary numbers represented by the digits 0 and 1, wherein, (a) each of said branch circuits coded to the binary numbers consisting of three zeros and of three permutations of two zeros and a one including a plurality of inputs, one for each of the corresponding binary numbers, and (b) each of said branch circuits coded to the binary numbers consisting of three ones and of the three permutations of two ones and a zero including a plurality of inputs, one for each of the corresponding binary numbers.

7. In a binary-octal coded control having identification code numbers to the base eight and employing the first eight binary numbers of the binary counting system for encoding of each significant position of the identification code numbers, (a) a plurality of decoding means each having a plurality of separate decoders one for each of the positions in said identification number, (b) said decoders each comprising a base support plate having a printed network interconnecting decoding elements in a logic circuit output and to four separate binary coded inputs corresponding respectively to a three similar bit binary number and three permutations of two of said similar bits and an opposite bit and having disabling means responsive to an improper input to disable the decoder, (c) a selection cable including groups of selection lines, each group including three selection lines one for each binary bit, (d) encoding means connected to said groups of selection lines for selective encoding on each group one of the first eight binary numbers of the binary counting system, and (e) input-output connectors connected to said selection cable and releasably connected to said plates to selectively connect said groups of selection lines to one of the several inputs for coding thereof to a preselected corresponding binary number and to the logic circuit output to establish a similar output connection for each input.

8. A decoder for a binary logic coded control system, which comprises (a) a base support having a plurality of circuit conductors secured thereto and terminating in similar groups of related input terminals and output terminals, each input terminal being adapted to receive either of two different signals to represent the binary digits 0 and 1 and each group of related input terminals being related to a different binary representation, (b) switching means mounted on said support and having output elements connected to conductors of said output terminals and having input elements establishing an output at the output terminals only in response to preselected inputs to the input elements, and (c) second switching and directional conducting means connecting said input elements to the conductors of said input terminals and establishing said preselected inputs in response to signals at the input terminals in accordance with the related binary representation.

9. The decoder of claim 8 encoded to four different binary representations which may include the digit 0 and 1 arranged as 000, 001, 010 and 100, each of said groups of input terminals being related to a different one of said four different binary representations, said decoder having (a) a single decoding transistor, (b) diode means connecting said decoding transistor to a selected one of said conductors in each group connected to the one input terminal of each of said groups related to the digit 1 in accordance with the position of the digit one in the binary representation for that group, (c) a disabling transistor connected to control the response of the decoding transistor, and (d) three diode means individually connecting said disabling transistor to said conductors connected to input terminals other than that connected to said decoding transistor.

10. The decoder of claim 8 encoded to four different binary representations which may include the digits 0 and 1 arranged as 011, 101, 110 and 111, each of said groups of input terminals being related to a different one of said four different binary representations, said decoder having (a) three decoding transistors, (b) three diode means individually connecting said decoding transistors to selected conductors, said selected conductors connecting said diode means to said groups of input terminals in accordance with the position of the digit one in the binary representation at said input terminals, (c) a disabling transistor connected to at least one of said decoding transistors, and (d) diode means connected to said disabling transistor and to selected conductors, said selected conductors connecting said diode means to the 0 position terminal in each of said groups of input terminals.

11. The decoder of claim 8 wherein said support is a plate of insulating material, and said conductors are secured to the opposite sides thereof and the conductors on one side are generally parallel to each other and perpendicular to the conductors on the opposite side, connection means extending through the plate and interconnecting conductors terminating in said output terminals and interconnecting said conductors terminating in said input terminals, said first switching means and said second switching and directional conducting means being disposed to one side of the plate and connected to the conductors on the corresponding side of the plate.

12. A multi-purpose decoder for a binary-octal logic coded control system, which comprises (a) a square base plate of insulating material and having six terminals at each edge thereof, (b) a first plurality of conductors printed on one side of said plate generally parallel to an edge thereof and terminating in connection to the six terminals on opposite edges of the plate to form three decoding input terminals, a ground input terminal and two output terminals at each edge, (c) a second plurality of conductors printed on the opposite side of said plate generally perpendicular to said first plurality of conductors and terminating in connection to the six terminals on opposite edges of the plate to form three decoding input terminals, a ground input terminal and two output terminals at each edge, and (d) decoding means secured to said plate in circuit connection to said first and second plurality of conductors and coding said means to four different selected binary numbers at the three decoding input terminals one at each edge, said selected binary numbers including one consisting of all similar binary digits and three each including two of said similar binary digits.

13. The multi-purpose decoder of claim 12 adapted to be selectively inserted into a socket having three decoding terminals, a ground terminal and two output terminals, having (a) the six terminals at each edge being similarly arranged in relation to each other whereby any one of the four coded edges can be inserted into a common socket.

14. In a data transmission system for gathering data from a plurality of remote transmission points, (a) a plurality of decoding circuits one for each transmission point assigned a predetermined unique identification code having a plurality of significant positions each of which positions is coded by one of a series of selected multiple position binary numbers, each decoding circuit including a separate decoder for each identification position and each decoder having decoding means responsive to an electrically encoded input corresponding to the designated multiple position binary number, (b) a data transmission cable adapted to be connected by said decoding circuits to each of said transmission points, (c) a selection cable means connected to each of said decoding circuits and having a separate line for each position in said binary members, and (d) encoding means connected to said selection cable for establishing electrical conditions on said selection lines representative of a selected one of said identifications.

15. The data transmission system of claim 14 wherein said series of selected binary numbers corresponds to the decimal digits 0–7 inclusive and each includes three significant positions, (a) each of said decoders coded in accordance with binary symbols for digits 0, 1, 2 and 4 and having a decoding transistor with input diode thereto and having a disabling transistor connected to disable said decoding transistor and having three separate input diodes connected to said disabling transistor, (b) each of said decoders coded in accordance with binary symbols for digits 3, 5, 6 and 7 having three decoding transistors connected in a logic output circuit with individual input diodes and having a disabling transistor connected to at least one of said decoding transistors to disable the same and having three input diodes connected to said disabling transistor, and (c) means in each decoder interconnecting said decoding transistors and disabling transistors to form four sets of inputs to each decoder, one set for each of the four possible related digits.

16. In a binary logic coded control for remotely controlling a plurality of spaced locations from a control center, (a) plurality of decoding units provided one at each location, said locations being divided into a plurality of decoding unit groups with decoding units within each group being different and providing duplicate binary coding of spaced locations between the groups, said decoding units having means for connection to a local power supply and a decoding element and having input terminals for binary encoding of the element and a disabling element connected to disable said decoding element, (b) selection cable means adapted to be encoded at said control center and connected to said decoding units, said selection cable means including decoding unit group control means for selectively enabling said groups one at a time, and (c) group selection means actuated at the control center for operating said group control means and including a separate control line for each group connected to the disabling element of the decoders of the corresponding group and controlled by said group selection means at the control center.

17. In a binary logic coded control for a plurality of spaced locations, (a) a plurality of decoding units provided one at each location, said locations being grouped into a plurality of decoding groups employing correspondingly coded decoding units for selected location in different groups and providing duplicated coding of spaced locations between the groups, (b) selection cable means adapted to be encoded at said control center and having decoding selection lines similarly connected to all of said decoding units, said selection cable means including power wires separately connected one to each of said groups and adapted to provide operating power thereto, (c) a power source at the control center, and (d) means to operatively connect the power source to said power wires for separately and individually conditioning the several groups one at a time for operation by the same encoding of the selection lines.

18. In a binary logic coded control for a plurality of remote locations which are divided into operating groups, (a) a control center having encoding means and an electrical ground means, (b) decoding units adapted to be operatively connected at each of said locations with differently coded decoding units within the several groups and with similarly coded decoding units in different groups, each of said decoding units including a disabling means having an input responsive to grounding to disable the corresponding decoding unit, (c) a single selection cable connected to the encoding means at said control center connected to each of said decoding units, said cable including power control lines one for each group connected to the disabling means of the associated decoding units, and (d) switch means at said control center selectively and individually connected to said power control lines and to said ground means such that only one of said several groups responds to the encoding means at said control center at any one time.

19. In a binary logic coded control for a plurality of remote locations, (a) a control center adapted to be centrally located within said locations with said locations being divided into operating groups to opposite sides thereof, (b) similar groups of different decoding units adapted to be operatively connected to each operating group with a different decoding unit at each of said locations within each group, (c) a single selection cable connected at said control center to a single encoding input and adapted to be connected to each of said decoding units, said cable including a control line separated at said control center and forming a pair of input terminals and connected to alternately enable and disable said groups, and (d) control means at said control center selectively connected to one of said input terminals of said control such that only one of said groups responds to the encoding input at said control center at any one time.

20. The binary logic coded control of claim 19 adapted to be connected in a control system having local power supply means for remote controlled points, wherein (a) each of said decoding units is adapted to be connected to the local power supply means and includes a disabling element to disable the corresponding decoding unit upon grounding of an input to said disabling element, (b) means to connect the input of the disabling element to said control line, and (c) said means at said control center including a ground and switch means to selectively connect the ground to the terminals of said control line.

21. A logic output circuit, which comprises (a) a power source having a positive side and a ground side, (b) an output transistor including a base constituting an input element and an emitter connected to the positive side of the power source and establishing a biasing potential to the output transistor to establish conduction of the output transistor, (c) a plurality of decoders, each decoder including at least one coded transistor having an emitter connected to a common input-output terminal, (d) an input circuit for each of said coded transistors including a load resistance connected to the input-output terminal and to the positive side of said power source and establishing a cut off potential at said input-output terminal, and (e) means individually connecting each of the input-output terminals to said base of said output transistor to cut off said output transistor whereby the biasing potential causes the output transistor to conduct when all of said decoders are actuated.

References Cited

UNITED STATES PATENTS

| | | | |
|---|---|---|---|
| 2,850,647 | 9/1958 | Fleisher | 307—88.5 |
| 3,045,210 | 7/1962 | Langley | 340—150 |
| 3,088,098 | 4/1963 | Moore | 340—150 |
| 3,110,013 | 11/1963 | Breese | 340—163 |
| 3,237,164 | 2/1966 | Evans | 340—147 |
| 3,300,759 | 1/1967 | Chapman | 340—163 |
| 3,027,548 | 3/1962 | Vaughan | 340—347 |
| 3,008,122 | 11/1961 | Anderson et al. | 340—147 |
| 2,953,772 | 9/1960 | Coley | 340—147 |
| 3,011,165 | 11/1961 | Angel et al. | 340—347 |
| 3,026,509 | 3/1962 | Buser | 340—347 |

MAYNARD R. WILBUR, *Primary Examiner.*

W. J. KOPACZ, *Assistant Examiner.*

UNITED STATES PATENT OFFICE

CERTIFICATE OF CORRECTION

Patent No. 3,396,379 August 6, 1968

William P. Chapman et al.

It is certified that error appears in the above identified patent and that said Letters Patent are hereby corrected as shown below:

Column 6, line 37, "conditions" should read -- conditioned --. Column 7, line 28, "conduit" should read -- conduct --. Column 13, line 56, "of", first occurrence, should read -- or -- Column 17, line 13, "members" should read -- numbers --.

Signed and sealed this 3rd day of March 1970.

(SEAL)
Attest:

Edward M. Fletcher, Jr.
Attesting Officer

WILLIAM E. SCHUYLER, JR.
Commissioner of Patents